United States Patent
Kumar et al.

(10) Patent No.: US 10,817,610 B2
(45) Date of Patent: Oct. 27, 2020

(54) METHOD AND SYSTEM FOR PROVIDING HACK PROTECTION IN AN AUTONOMOUS VEHICLE

(71) Applicant: WIPRO LIMITED, Bangalore (IN)

(72) Inventors: Vijay Kumar, Bangalore (IN); Hemachandra Ramanath Bhat, Bangalore (IN); Thomas Chittakattu Ninan, Kannur (IN)

(73) Assignee: Wipro Limited, Bangalore (IN)

( * ) Notice: Subject to any disclaimer, the term of this patent is extended or adjusted under 35 U.S.C. 154(b) by 398 days.

(21) Appl. No.: 15/938,877

(22) Filed: Mar. 28, 2018

(65) Prior Publication Data

US 2019/0294799 A1  Sep. 26, 2019

(30) Foreign Application Priority Data

Mar. 23, 2018 (IN) .............................. 201841010860

(51) Int. Cl.
| | |
|---|---|
| *G06F 21/57* | (2013.01) |
| *G05D 1/00* | (2006.01) |
| *G06F 21/81* | (2013.01) |
| *B60R 25/00* | (2013.01) |

(52) U.S. Cl.
CPC ............ *G06F 21/575* (2013.01); *B60R 25/00* (2013.01); *G05D 1/0055* (2013.01); *G05D 1/0088* (2013.01); *G06F 21/57* (2013.01); *G06F 21/81* (2013.01)

(58) Field of Classification Search
CPC .. G05D 1/0055; G05D 1/0088; G06F 21/575; G06F 21/81; G06F 21/57; B60R 25/00
USPC ............................................. 713/330
See application file for complete search history.

(56) References Cited

U.S. PATENT DOCUMENTS

| | | | |
|---|---|---|---|
| 9,805,200 B2 | 10/2017 | Huang et al. | |
| 2010/0004793 A1* | 1/2010 | Ohkuwa | H02J 1/14 700/295 |
| 2014/0250531 A1* | 9/2014 | Moeller | H04W 4/029 726/23 |
| 2015/0271201 A1* | 9/2015 | Ruvio | H04L 67/12 726/23 |

(Continued)

*Primary Examiner* — Kambiz Zand
*Assistant Examiner* — Benjamin A Kaplan
(74) *Attorney, Agent, or Firm* — Finnegan, Henderson, Farabow, Garrett & Dunner, LLP (57) ABSTRACT

A method and hack protection system for providing hack protection in an autonomous vehicle is disclosed. The method includes generating, by the hack protection system, random power ON sequence, where the random power ON sequence is in encrypted format and generated during power ON of the autonomous vehicle. The method further includes detecting current flow to sensors in the autonomous vehicle, the sensors are controlled by power switching circuitry and is responsive to power switching control signals generated by a system software module in response to the random power ON sequence, the random power ON sequence being converted from the encrypted format into decrypted format by the system software module. The method includes determining actual power ON sequence of the sensors in response to the current flow. Moreover, the method includes comparing the actual power ON sequence with the random power ON sequence to control power of the autonomous vehicle.

13 Claims, 5 Drawing Sheets

(56) References Cited

U.S. PATENT DOCUMENTS

2017/0278323 A1\* 9/2017 Gupta .................. H04W 64/00
2020/0193549 A1\* 6/2020 Pedersen .............. G06Q 10/063

\* cited by examiner

METHOD AND SYSTEM FOR PROVIDING HACK PROTECTION IN AN AUTONOMOUS VEHICLE

TECHNICAL FIELD

This disclosure relates generally to autonomous vehicles and more particularly to a method and system for providing hack protection in an autonomous vehicle.

BACKGROUND

Automobile industry has seen various changes and upcoming trends over years. Autonomous vehicles or driverless vehicles are one such upcoming trend in the automobile industry. As there are no human interventions for operating such vehicles, authenticity of system software being used to control operations of the autonomous vehicles is essential or critical for ensuring user safety. The user safety, however, can be threatened and can cause major security concerns if the system software gets hacked. Moreover, the system software alone cannot ensure security as software dependent systems are easy prey to hacking.

SUMMARY

In one embodiment, a method of providing hack protection in an autonomous vehicle is disclosed. The method includes generating, by a hack protection system, a random power ON sequence, where the random power ON sequence is in an encrypted format and generated during power ON of the autonomous vehicle. The method further includes detecting current flow to one or more sensors in the autonomous vehicle, where the one or more sensors are controlled by a power switching circuitry in the autonomous vehicle, the power switching circuitry responsive to one or more power switching control signals generated by a system software module of the autonomous vehicle in response to the random power ON sequence, the random power ON sequence being converted from the encrypted format into a decrypted format by the system software module. The method includes determining, by the hack protection system, an actual power ON sequence of the one or more sensors in response to the current flow. Moreover, the method includes comparing, by the hack protection system, the actual power ON sequence with the random power ON sequence to control power of the autonomous vehicle.

In another embodiment, a hack protection system for providing hack protection in an autonomous vehicle is disclosed. The hack protection system includes at least one processor and a computer-readable medium storing instructions that, when executed by the at least one processor, cause the at least one processor to generate a random power ON sequence, wherein the random power ON sequence is in an encrypted format and generated during power ON of the autonomous vehicle. The instructions further cause the processor to detect current flow to one or more sensors in the autonomous vehicle, where the one or more sensors are controlled by a power switching circuitry in the autonomous vehicle, the power switching circuitry responsive to one or more power switching control signals generated by a system software module of the autonomous vehicle in response to the random power ON sequence, the random power ON sequence being converted from the encrypted format into a decrypted format by the system software module. The instructions further cause the processor to determine an actual power ON sequence of the one on more sensors in response to the current flow. The instructions cause the processor to compare the actual power ON sequence with the random power ON sequence to control power of the autonomous vehicle.

In one embodiment, a non-transitory computer readable medium is disclosed. The non-transitory computer readable medium includes instructions stored thereon that when processed by at least one processor cause a hack protection system, associated with an autonomous vehicle, to perform operations including generating a random power ON sequence, where the random power ON sequence is in an encrypted format and generated during power ON of the autonomous vehicle. The instructions cause the hack protection system to detect current flow to one or more sensors in the autonomous vehicle, where the one or more sensors are controlled by a power switching circuitry in the autonomous vehicle, the power switching circuitry responsive to one or more power switching control signals generated by a system software module of the autonomous vehicle in response to the random power ON sequence, the random power ON sequence being converted from the encrypted format into a decrypted format by the system software module. The instructions cause the hack protection system to determine an actual power ON sequence of the one on more sensors in response to the current flow. Moreover, the instructions cause the hack protection system to compare the actual power ON sequence with the random power ON sequence to control power of the autonomous vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
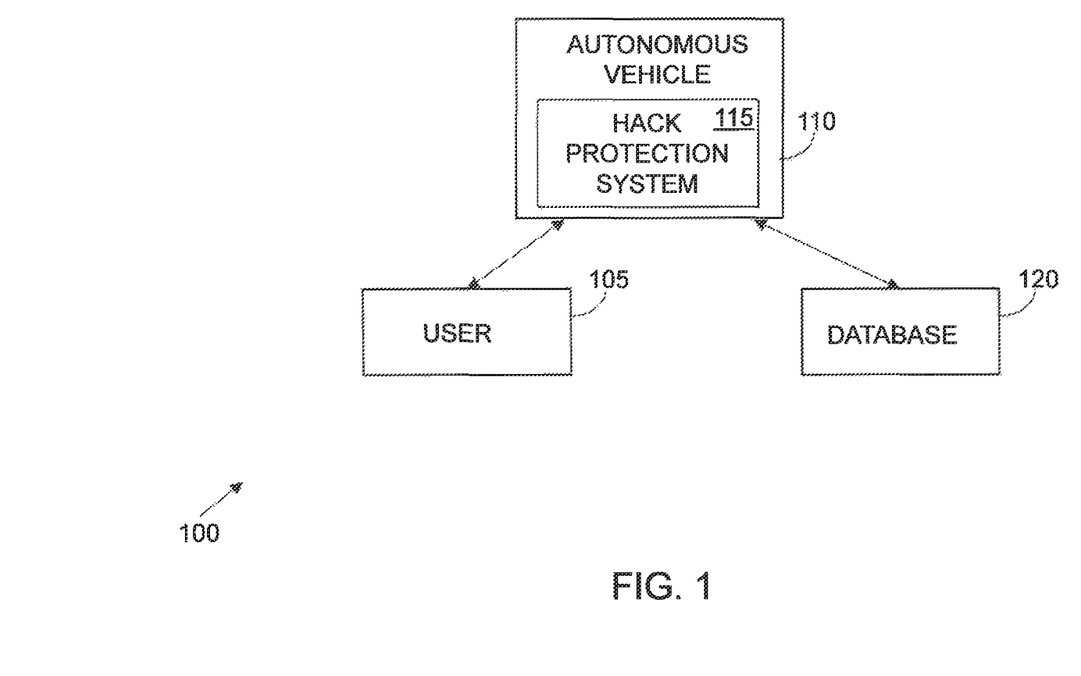
FIG. 1 is a block diagram illustrating a system for providing hack protection in an autonomous vehicle, in accordance with an embodiment.

Additional illustrative embodiments are listed below. In one embodiment, a block diagram illustrating a system 100 for providing hack protection in an autonomous vehicle is illustrated in FIG. 1. The system 100 includes a user 105 that interacts with an autonomous vehicle 110. The autonomous vehicle 110 is defined as a vehicle that is capable of sensing surrounding environment and navigating without human input. The autonomous vehicle 110 is capable of including a hack protection system 115 that provides hack protection to the autonomous vehicle 110 using one or more power sequences. The one or more power sequences can be stored in a database 120. In some embodiments, the database 120 can be included within the hack protection system 115.

Alternatively, the one or more power sequences may be stored on a server (not shown in FIG. 1) and may be accessed by the hack protection system 115 via a network (not shown in FIG. 1). Network may be a wired or a wireless network and the examples may include, but are not limited to the Internet, Wireless Local Area Network (WLAN), Wi-Fi, Long Term Evolution (LIE), Worldwide Interoperability for Microwave Access (WiMAX), and General Packet Radio Service (GPRS).

When the user 105 of the autonomous vehicle 110 enables power ON of the autonomous vehicle 110, the hack protection system 115 in the autonomous vehicle 110 generates a random power ON sequence which is in an encrypted format. The hack protection system 115 detects conversion of the random power ON sequence into a decrypted format by a system software of the autonomous vehicle 110 to control a power switching circuitry in the autonomous vehicle 110. The hack protection system 115 detects current flow to one or more sensors in the autonomous vehicle 110. The hack protection system 115 determines an actual power ON sequence of the one or more sensors in response to the current flow. The hack protection system 115 further compares the actual power ON sequence with the random power ON sequence to control power of the autonomous vehicle.

The autonomous vehicle 110 further includes various modules that enable hack protection of the autonomous vehicle 110. These modules are explained in detail in conjunction with FIG. 2.

Figure 2:
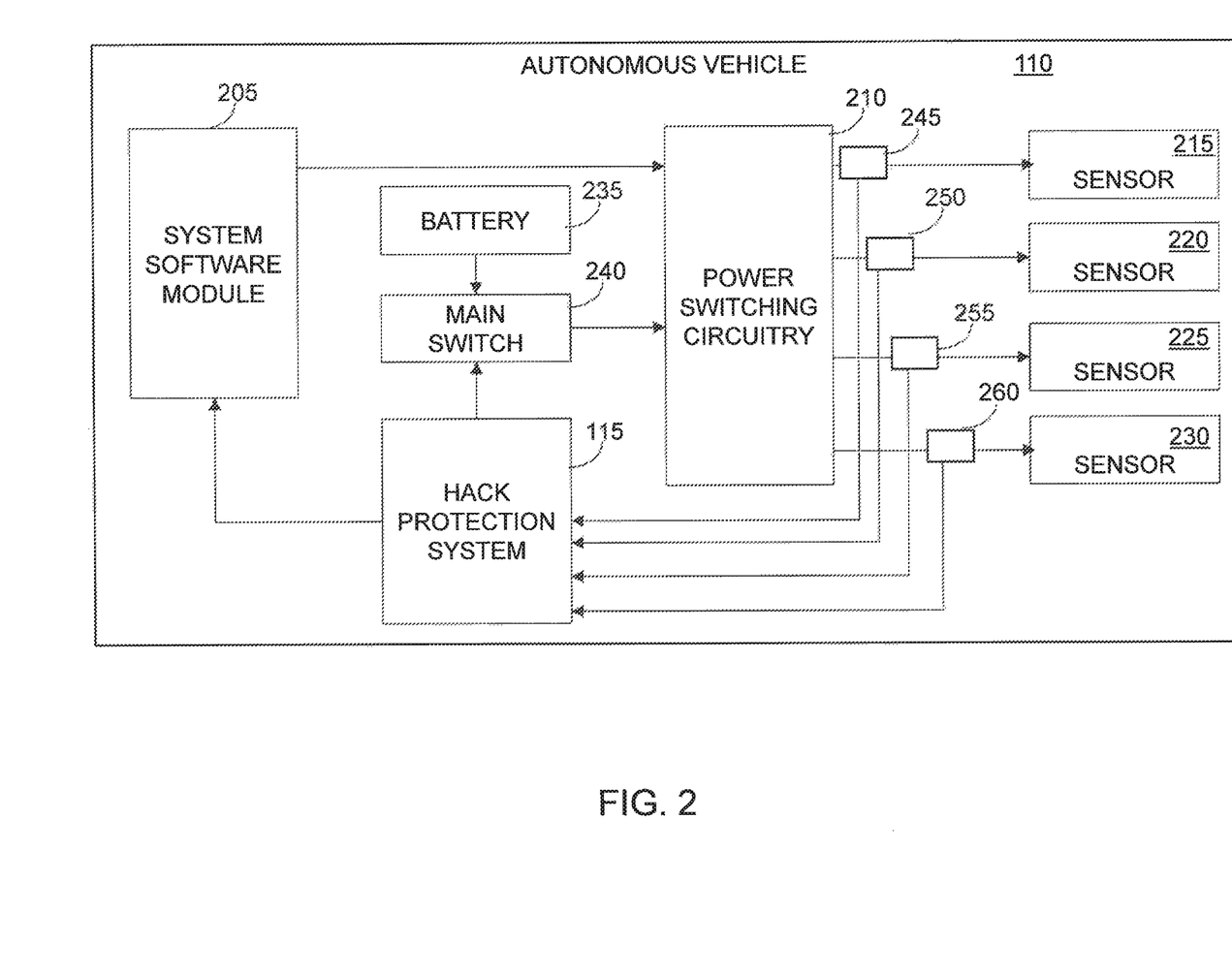
FIG. 2 is a block diagram illustrating various modules within an autonomous vehicle configured to provide hack protection, in accordance with an embodiment.

FIG. 2 is a block diagram illustrating various modules within the autonomous vehicle 110 configured to provide hack protection in the autonomous vehicle 110, in accordance with an embodiment. The autonomous vehicle 110 includes the hack protection system 115, a system software module 205, a power switching circuitry 210, one or more sensors, for example sensor 215, sensor 220, sensor 225 and sensor 230, a battery 235 and a main switch 240. Examples of the one or more sensors include, but are not limited to, light detection and ranging (LIDAR), global positioning system (GPS), cameras, ultrasound sensors, headlights, heating, ventilation and air conditioning (HVAC), and the like. The one or more sensors perform various operations of the autonomous vehicle 110. The battery 235 supplies electrical current to the autonomous vehicle 110. The main switch 240 controls power supply to the autonomous vehicle 110.

The autonomous vehicle 110 can also include one or more current sensors, for example a current sensor 245 coupled to the sensor 215, a current sensor 250 coupled to the sensor 220, a current sensor 255 coupled to the sensor 225, and a current sensor 260 coupled to the sensor 230. In some embodiments, the current sensors may be non-intrusive sensors, for example hall sensors.

When the user 105 accesses the autonomous vehicle 110 and enables power ON of the autonomous vehicle 110, the hack protection system 115 generates a random power ON sequence. The random power ON sequence undergoes encryption by the hack protection system 115 to generate an encrypted format. The random power ON sequence, in the encrypted format, is transmitted to the system software module 205. Exemplary illustrations of random power ON sequences that are generated by the hack protection system 115 are explained in detail in conjunction with FIG. 3.

The system software module 205 receives the random power ON sequence, in the encrypted format, and decrypts the random power ON sequence into a decrypted format. The system software module 205 subsequently controls the power switching circuitry 210 to power ON one or more sensors according to the decrypted format of the random power ON sequence. The system software module 205 generates one or more power switching control signals that enable the power switching circuitry 210 in the autonomous vehicle 110 to control switching ON of the one or more sensors in accordance with the random power ON sequence received from the hack protection system 115.

The power switching circuitry 210 receives the one or more power switching control signals from the system software module 205 and is configured to switch ON power to the one or more sensors accordingly.

The one or more current sensors are coupled between the power switching circuitry 210 and the one or more sensors and are capable of sensing current flow to the one or more sensors in the autonomous vehicle 110. For instance, the current sensor 245 senses current flow to the sensor 215, the current sensor 250 senses current flow to the sensor 220, the current sensor 255 senses current flow to the sensor 225, and the current sensor 260 senses current flow to the sensor 230.

The hack protection system 115, coupled to the one or more current sensors, detects the current flow to the one or more sensors in the autonomous vehicle 110. The hack protection system 115 receives power switching information from the one or more current sensors coupled to the one or more sensors.

The hack protection system 115 determines an actual power ON sequence of the one on more sensors in response to the current flow by analyzing power ON instances of the one or more sensors.

The hack protection system 115 further compares the actual power ON sequence with the random power ON sequence to control power of the autonomous vehicle 110.

In some embodiments, the hack protection system 115 controls the power of the autonomous vehicle 110 by maintaining power ON in the autonomous vehicle 110 if the actual power ON sequence matches the random power ON sequence to indicate authenticity of system software in the autonomous vehicle 110. In other words, the system software is free from being hacked. In some embodiments, the hack protection system 115 controls the power of the autonomous vehicle 110 by performing power OFF in the autonomous vehicle 110, if the actual power ON sequence mismatches the random power ON sequence to indicate non-authenticity of system software in the autonomous vehicle 110. In other words, the system software has been hacked.

The hack protection system 115 further validates authenticity of the system software in the autonomous vehicle 110 based on comparison of the actual power ON sequence with the random power ON sequence. The autonomous vehicle 110 is only then operated or put into motion if the validity of the system software in the autonomous vehicle 110 is authenticated.

In some embodiments, the system software module 205 is able to decrypt the random power ON sequence into the decrypted format only if the system software in the autonomous vehicle 110 is authentic.

In some embodiments, the hack protection system 115 sets a predefined number of failed attempts during the comparison as an additional security measure. If the hack protection system 115 detects that the number of failed attempts exceeds the predefined number, the autonomous vehicle is permanently powered OFF and may be restarted only with additional manual authentication methods, for instance a physical key or similar unlocking mechanism, by the user 105.

Figure 3:
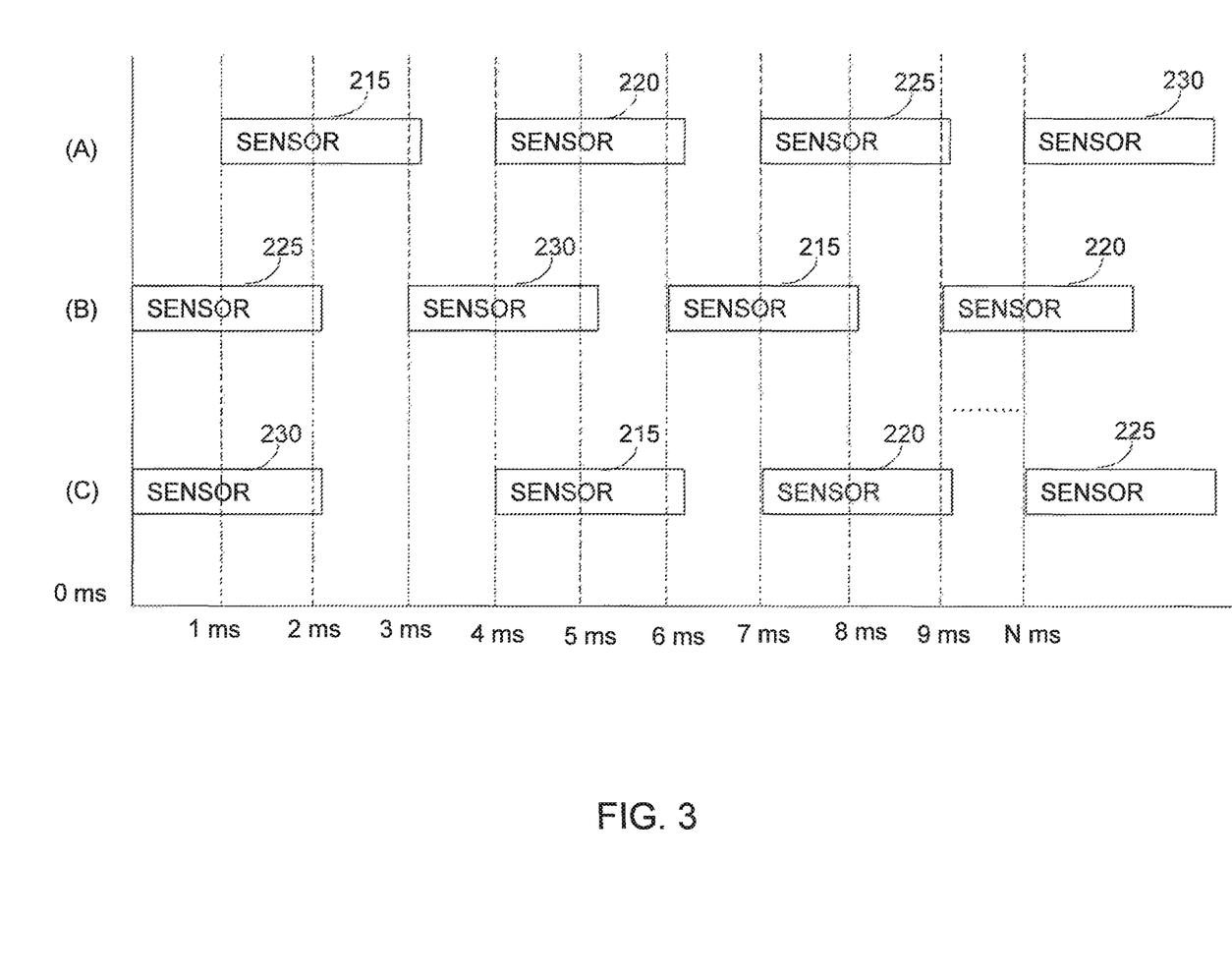
FIG. 3 shows exemplary illustrations of random power ON sequences that are generated by the hack protection system, in accordance with an embodiment.

Referring now to FIG. 3, exemplary illustrations of random power ON sequences that are generated by the hack protection system 115 are shown, in accordance with an embodiment.

As illustrated in FIG. 3, a random power ON sequence 'A' is generated by the hack protection system 115 in which the sensor 215 is powered ON between 1 milli seconds (ms) and 3.2 ms, the sensor 220 is powered ON between 4 ms and 6.2 ms, the sensor 225 is powered ON between 7 ms and 9.2 ms, the sensor 230 is powered ON at N ms. The random power ON sequence 'A' is further encrypted and sent to the system software module 205. The system software module 205 decrypts the encrypted format of the random power ON sequence 'A' into the decrypted format and generates one or more power switching control signals in accordance with the random power ON sequence 'A'. The one or more power switching control signals enable the power switching circuitry 210 to switch ON the one or more sensors. The sensors 215, 220, 225 and 230 are switched ON, in that order, as per the decrypted format of the random power ON sequence 'A'. The hack protection system 115 determines the actual power ON sequence of the sensors 215, 220, 225 and 230 in response to the current flow and compares the actual power ON sequence with the random power ON sequence 'A'. If both match, the authenticity of the system software is validated and the autonomous vehicle 110 can be put into operation. If, however, the actual power ON sequence of the sensors 215, 220, 225 and 230 does not match the random power ON sequence 'A', the system software is determined to be non-authentic or hacked and the autonomous vehicle 110 is powered OFF.

In another example, a random power ON sequence 'B' is generated by the hack protection system 115 in which the sensor 225 is powered ON between 0 ms and 2.2 ms, the sensor 230 is powered ON between 3 ms and 5.2 ms, the sensor 215 is powered ON between 6 ms and 82 ms, the sensor 220 is powered ON at 9 ms. The random power ON sequence 'B' is further encrypted and sent to the system software module 205. The system software module 205 decrypts the encrypted format of the random power ON sequence 'B' into the decrypted format and generates one or more power switching control signals in accordance with the random power ON sequence 'B'. The one or more power switching control signals enable the power switching circuitry 210 to control or switch ON the one or more sensors. The sensors 225, 230, 215 and 220 are switched ON, in that order, as per the decrypted format of the random power ON sequence 'B'. The hack protection system 115 determines the actual power ON sequence of the sensors 225, 230, 215 and 220 in response to the current flow and compares the actual power ON sequence with the random power ON sequence 'B'. If both match, the authenticity of the system software is validated and the autonomous vehicle 110 can be put into operation. If, however, the actual power ON sequence of the sensors 225, 230, 215 and 220 does not match the random power ON sequence the system software is determined to be non-authentic or hacked and the autonomous vehicle 110 is powered OFF.

In another example, a random power ON sequence 'C' is generated by the hack protection system 115 in which the sensor 230 is powered ON between 0 ms and 2.2 ms, the sensor 215 is powered ON between 4 ms and 6.2 ms, the sensor 220 is powered ON between 7 ms and 9.2 ms, the sensor 225 is powered ON at N ms. The random power ON sequence 'C' is further encrypted and sent to the system software module 205. The system software module 205 decrypts the encrypted format of the random power ON sequence 'C' into the decrypted format and generates one or more power switching control signals in accordance with the random power ON sequence 'C'. The one or more power switching control signals enable the power switching circuitry 210 to control or switch ON the one or more sensors. The sensors 230, 215, 220 and 225 are switched ON, in that order, as per the decrypted format of the random power ON sequence 'C'. The hack protection system 115 determines the actual power ON sequence of the sensors 230, 215, 220 and 225 in response to the current flow and compares the actual power ON sequence with the random power ON sequence 'C'. If both match, the authenticity of the system software is validated and the autonomous vehicle 110 can be put into operation. If, however, the actual power ON sequence of the sensors 230, 215, 220 and 225 does not match the random power ON sequence 'C', the system software is determined to be non-authentic or hacked and the autonomous vehicle 110 is powered OFF.

Figure 4:
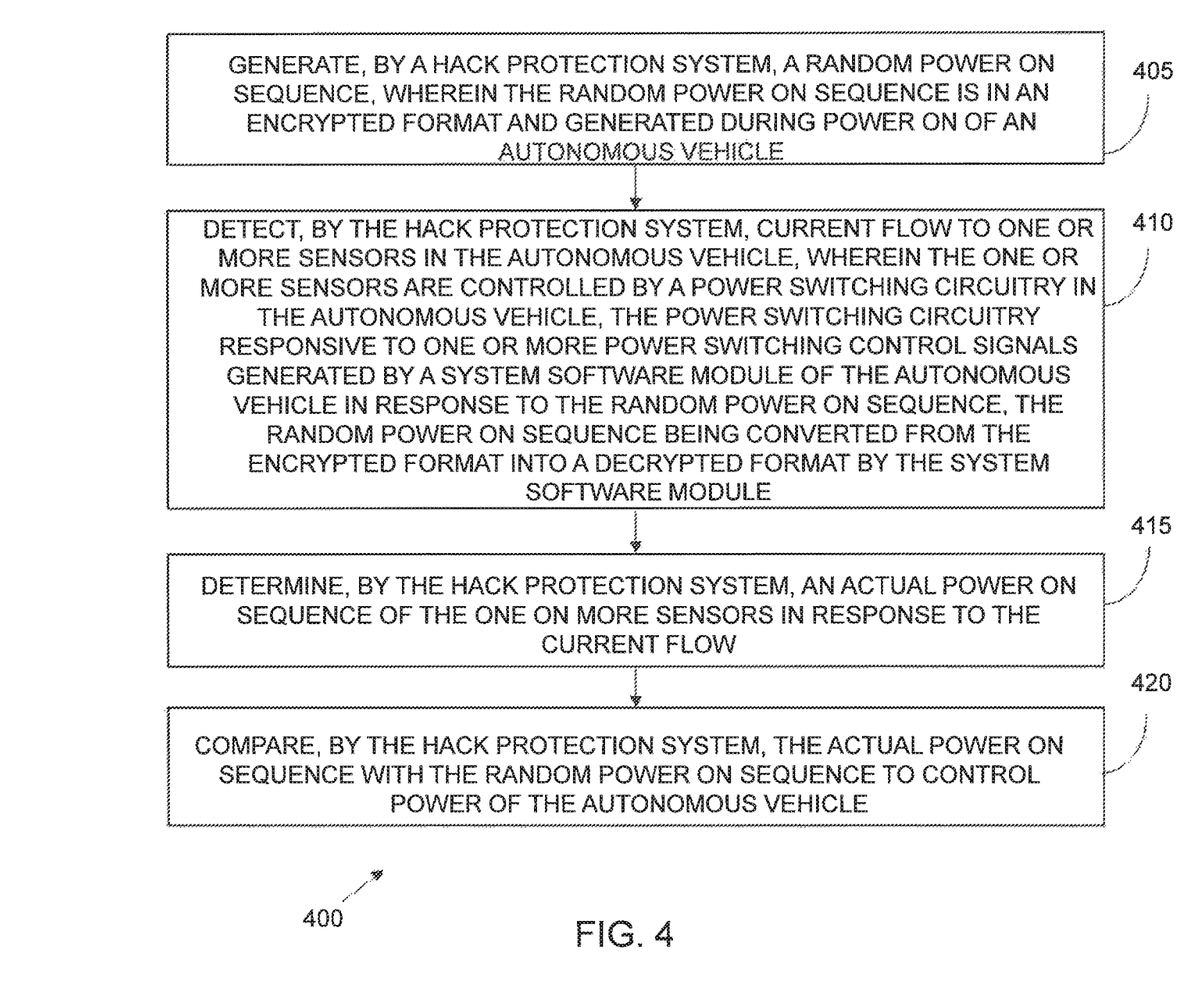
FIG. 4 illustrates a flowchart of a method for providing hack protection in an autonomous vehicle, in accordance with an embodiment.

The method of providing hack protection in the autonomous vehicle 110 is further explained in detail in conjunction with FIG. 4.

Referring now to FIG. 4, a flowchart of a method 400 of providing hack protection in an autonomous vehicle, for example the autonomous vehicle 110 of FIG. 1, is illustrated, in accordance with an embodiment. The method 400 of providing the hack protection in the autonomous vehicle is typically run during power ON of the autonomous vehicle by a user, for example the user 105 of FIG. 1.

At step 405, the method 400 include generating, by a hack protection system, for example the hack protection system 115 of the autonomous vehicle 110 of FIG. 1, a random power ON sequence. The random power ON sequence is encrypted to an encrypted format and generated during the power ON of the autonomous vehicle. The random power ON sequence, in the encrypted format, is transmitted to a system software module, for example the system software module 205 of FIG. 2. Some examples of random power ON sequences that are generated by the hack protection system are described in detail with reference to FIG. 3, and are not explained herein for sake of brevity.

The random power ON sequence is converted from the encrypted format into a decrypted format by the system software module.

At step 410, the method 400 includes detecting, by the hack protection system, current flow to one or more sensors in the autonomous vehicle. The one or more sensors, for example the sensors 215, 220, 225 and 230 of FIG. 2, are controlled by a power switching circuitry, for example the power switching circuitry 210 of FIG. 2, in the autonomous vehicle. Examples of the one or more sensors include, but are not limited to, light detection and ranging (LIDAR), global positioning system (GPS), cameras, ultrasound sensors, headlights, heating, ventilation and air conditioning (HVAC), and the like. The power switching circuitry is responsive to one or more power switching control signals generated by the system software module of the autonomous vehicle in response to the random power ON sequence that is in the decrypted format.

In some embodiments, the method 400 includes receiving, by the hack protection system, power switching information from one or more current sensors coupled to the one or more sensors. The one or more current sensors, for example the current sensors 245, 250, 255 and 260 of FIG. 2, sense the current flow to the one or more sensors based on the decrypted format of the random power ON sequence.

At step 415, the method 400 includes determining, by the hack protection system, an actual power ON sequence of the one on more sensors in response to the current flow. In some embodiments, the actual power ON sequence of the one on more sensors are determined by analyzing power ON instances of the one or more sensors by the hack protection system.

At step 420, the method 400 includes comparing, by the hack protection system, the actual power ON sequence with the random power ON sequence to control power of the autonomous vehicle. In one instance, the power of the autonomous vehicle is controlled by maintaining power ON in the autonomous vehicle if the actual power ON sequence matches the random power ON sequence to indicate authenticity of system software in the autonomous vehicle. In another instance, the power of the autonomous vehicle is controlled by performing power OFF in the autonomous vehicle, if the actual power ON sequence mismatches the random power ON sequence to indicate non-authenticity of system software in the autonomous vehicle.

In some embodiments, the method 400 includes validating, by the hack protection system, authenticity of the system software in the autonomous vehicle based on comparison of the actual power ON sequence with the random power ON sequence. If the actual power ON sequence matches with the random power ON sequence, it indicates that the system software could decrypt the random power ON sequence and control the power switching circuitry according to the random power ON sequence. This validates the system software as authentic. The system software is unable to decrypt the random power ON sequence if the system software is being hacked or is not authentic. Hence the hack protection system shall determine the system software as non-authentic in case the actual power ON sequence does not match with the random power ON sequence generated initially.

In some embodiments, a predefined number of failed attempts during the step of comparison can be set by the hack protection system as an additional security measure. If a number of failed attempts exceeds the predefined number, the autonomous vehicle is permanently powered OFF and may be restarted only with additional manual authentication methods, for instance a physical key or similar unlocking mechanism, by the user.

Figure 5:
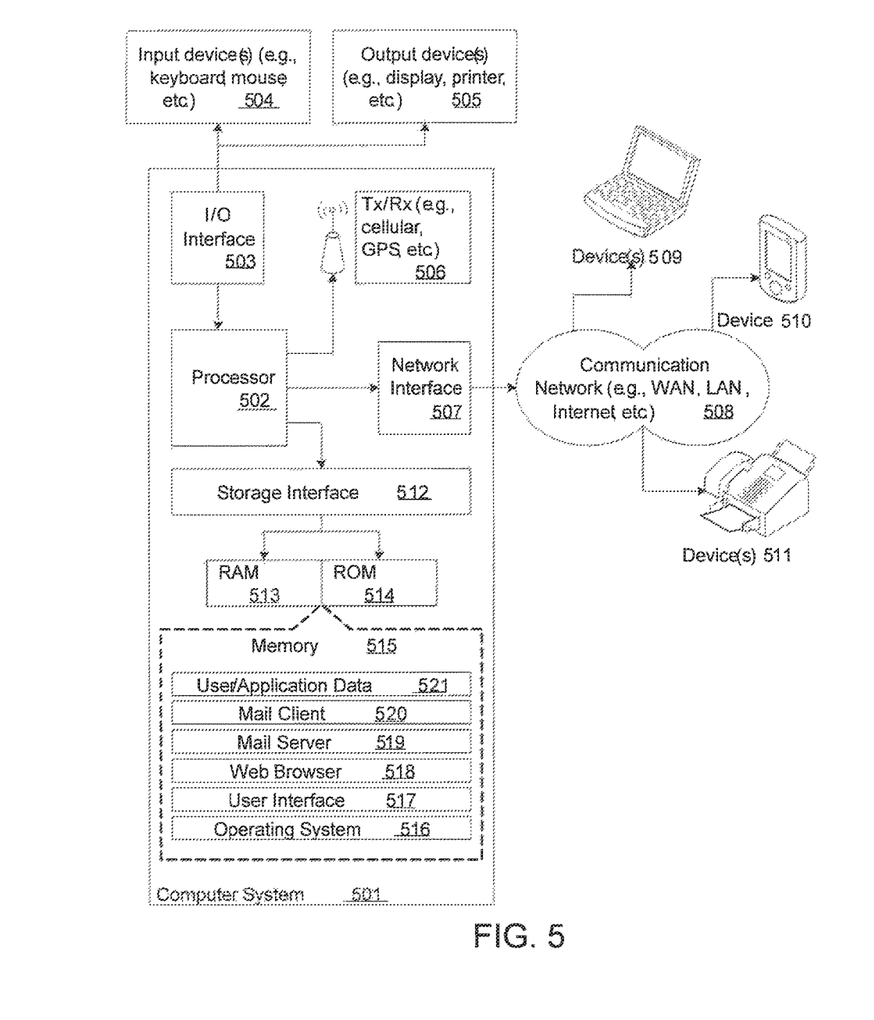
FIG. 5 illustrates a block diagram of an exemplary computer system for implementing various embodiments.

FIG. 5 is a block diagram of an exemplary computer system for implementing various embodiments. Computer system 501 may include a central processing unit ("CPU" or "processor") 502. Processor 502 may include at least one data processor for executing program components for executing user- or system-generated requests. A user may include a person, a person using a device such as such as those included in this disclosure, or such a device itself. Processor 502 may include specialized processing units such as integrated system (bus) controllers, memory management control units, floating point units, graphics processing units, digital signal processing units, etc. Processor 502 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via an I/O interface 503. I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x. Bluetooth, cellular (e.g., code-division multiple access (CDMA), high-speed packet access (HSPA+), global system for mobile communications (GSM), long-term evolution (LTE), WiMax, or the like), etc.

Using I/O interface 503, computer system 501 may communicate with one or more I/O devices. For example, an input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with processor 502. Transceiver 506 may facilitate various types of wireless transmission or reception. For example, transceiver 506 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 502 may be disposed in communication with a communication network 508 via a network interface 507. Network interface 507 may communicate with communication network 508. Network interface 507 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 508 may include, without limitation, a direct interconnection, local area network (LAN), wide area network (WAN), wireless network (e.g., using Wireless Application Protocol), the Internet, etc. Using network interface 507 and communication network 508, computer system 501 may communicate with devices 509, 510, and 511. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 501 may itself embody one or more of these devices.

In some embodiments, processor 502 may be disposed in communication with one or more memory devices (e.g., RAM 513, ROM 514, etc.) via a storage interface 512. Storage interface 512 may connect to memory 515 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 515 may store a collection of program or database components, including, without limitation, an operating system 516, user interface application 517, web browser 518, mail server 519, mail client 520, user/application data 521 (e.g., any data variables or data records discussed in this disclosure), etc. Operating system 516 may facilitate resource management and operation of computer system 501. Examples of operating systems 516 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® LOS® platform, GOOGLE® ANDROID® platform, BLACKBERRY® OS platform, or the like. User interface 517 may facilitate display, execution, interaction, manipulation, or operation of program components through textual or graphical facilities. For example, user interfaces may provide computer interaction interface elements on a display system operatively connected to computer system 501, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 501 may implement a web browser 518 stored program component. Web browser 518 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 501 may implement a mail server 519 stored program component. Mail server 519 may be an Internet mail server such as MICROSOFT® EXCHANGE® mail server, or the like. Mail server 519 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 519 may utilize communication protocols such as Internet message access protocol (IMAP), messaging application programming interface (MAPI), Microsoft Exchange, post office protocol (POP), simple mail transfer protocol (SMTP), or the like. In some embodiments, computer system 501 may implement a mail client 520 stored program component. Mail client 520 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 501 may store user/application data 521, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a method and system for providing hack protection in an autonomous vehicle. The proposed disclosure provides a dedicated hardware unit, the hack protection system, for providing the hack protection in the autonomous vehicle. The present disclosure also generates a random power ON sequence, compares the actual power ON sequence with the random power ON sequence to validate the authenticity of the system software and to prevent the autonomous vehicle from hacking.

The specification has described method and system for providing hack protection in an autonomous vehicle. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

REFERRAL NUMERALS

| Reference Number | Description |
| --- | --- |
| 100 | System |
| 105 | User |
| 110 | Autonomous vehicle |
| 115 | Hack protection system |
| 120 | Database |
| 205 | System software module |
| 210 | I/O interface |
| 215 | Sensor |
| 220 | Sensor |
| 225 | Sensor |
| 230 | Sensor |
| 235 | Battery |
| 240 | Main switch |
| 245 | Current sensor |
| 250 | Current sensor |
| 255 | Current sensor |
| 260 | Current sensor |
| 501 | Computer system |
| 502 | Processor |
| 503 | I/O interface |
| 504 | Input devices |
| 505 | Output devices |
| 506 | Tx/Rx |
| 507 | Network interface |
| 508 | Communication network |
| 509 | Device(s) |
| 510 | Device |
| 511 | Device(s) |
| 512 | Storage interface |
| 513 | RAM |
| 514 | ROM |
| 515 | Memory |
| 516 | Operating system |
| 517 | User interface |
| 518 | Web browser |
| 519 | Mail server |
| 520 | Mail client |
| 521 | User/application data |

What is claimed is:

1. A method of providing hack protection in an autonomous vehicle, the method comprising:

generating, by a hack protection system, a random power ON sequence, wherein the random power ON sequence is in an encrypted format and generated during power ON of the autonomous vehicle;

detecting, by the hack protection system, current flow to one or more sensors in the autonomous vehicle, wherein the one or more sensors are controlled by a power switching circuitry in the autonomous vehicle, the power switching circuitry responsive to one or more power switching control signals generated by a system software module of the autonomous vehicle in response to the random power ON sequence, the random power ON sequence being converted from the encrypted format into a decrypted format by the system software module;

determining, by the hack protection system, an actual power ON sequence of the one on more sensors in response to the current flow; and comparing, by the hack protection system, the actual power ON sequence with the random power ON sequence to control power of the autonomous vehicle.

2. The method as claimed in claim 1, wherein generating the random power ON sequence comprises:

encrypting, by the hack protection system, the random power ON sequence.

3. The method as claimed in claim 1, wherein detecting the current flow to the one or more sensors comprises:

receiving, by the hack protection system, power switching information from one or more current sensors coupled to the one or more sensors.

4. The method as claimed in claim 1, wherein determining the actual power ON sequence of the one on more sensors comprises:

analyzing, by the hack protection system, power ON instances of the one or more sensors.

5. The method as claimed in claim 1, wherein the power of the autonomous vehicle is controlled by one of:

maintaining, by the hack protection system, power ON in the autonomous vehicle if the actual power ON sequence matches the random power ON sequence to indicate authenticity of system software in the autonomous vehicle; and performing, by the hack protection system, power OFF in the autonomous vehicle, if the actual power ON sequence mismatches the random power ON sequence to indicate non-authenticity of system software in the autonomous vehicle.

6. The method as claimed in claim 1 and further comprising:

validating, by the hack protection system, authenticity of system software in the autonomous vehicle based on comparison of the actual power ON sequence with the random power ON sequence.

7. A hack protection system for providing hack protection in an autonomous vehicle, the system comprising:

at least one processor; and a computer-readable medium storing instructions that, when executed by the at least one processor, cause the at least one processor to:

generate a random power ON sequence, wherein the random power ON sequence is in an encrypted format and generated during power ON of the autonomous vehicle;

detect current flow to one or more sensors in the autonomous vehicle, wherein the one or more sensors are controlled by a power switching circuitry in the autonomous vehicle, the power switching circuitry responsive to one or more power switching control signals generated by a system software module of the autonomous vehicle in response to the random power ON sequence, the random power ON sequence being converted from the encrypted format into a decrypted format by the system software module;

determine an actual power ON sequence of the one on more sensors in response to the current flow; and compare the actual power ON sequence with the random power ON sequence to control power of the autonomous vehicle.

8. The hack protection system as claimed in claim 7, wherein to generate the random power ON sequence the instructions cause the at least one processor to:

encrypt the random power ON sequence.

9. The hack protection system as claimed in claim 7, wherein to detect the current flow to the one or more sensors the instructions cause the at least one processor to:

receiving, by the hack protection system, power switching information from one or more current sensors coupled to the one or more sensors.

10. The hack protection system as claimed in claim 7, wherein to determine the actual power ON sequence of the one on more sensors the instructions cause the at least one processor to:

analyze power ON instances of the one or more sensors.

11. The hack protection system as claimed in claim 7, wherein to control power of the autonomous vehicle the instructions cause the at least one processor to one of:

maintain power ON in the autonomous vehicle if the actual power ON sequence matches the random power ON sequence to indicate authenticity of system software in the autonomous vehicle; and perform power OFF in the autonomous vehicle, if the actual power ON sequence mismatches the random power ON sequence to indicate non-authenticity of system software in the autonomous vehicle.

12. The hack protection system as claimed in claim 7 and further wherein the instructions cause the at least one processor to:

validate authenticity of system software in the autonomous vehicle based on comparison of the actual power ON sequence with the random power ON sequence.

13. A non-transitory computer readable medium including instructions stored thereon that when processed by at least one processor cause a hack protection system, associated with an autonomous vehicle, to perform operations comprising:

generating a random power ON sequence, wherein the random power ON sequence is in an encrypted format and generated during power ON of the autonomous vehicle and sent to the system software of the autonomous vehicle;

detecting current flow to one or more sensors in the autonomous vehicle, wherein the one or more sensors are controlled by a power switching circuitry in the autonomous vehicle, the power switching circuitry responsive to one or more power switching control signals generated by a system software module of the autonomous vehicle in response to the random power ON sequence, the random power ON sequence being converted from the encrypted format into a decrypted format by the system software module;

determining an actual power ON sequence of the one on more sensors in response to the current flow; and comparing the actual power ON sequence with the random power ON sequence to control power of the autonomous vehicle.

* * * * *